United States Patent [19]

Arseneau

[11] Patent Number: 4,486,663
[45] Date of Patent: Dec. 4, 1984

[54] DUAL INTEGRATOR FOR A RADIATION DETECTOR

[75] Inventor: Roger E. Arseneau, Arlington Heights, Ill.

[73] Assignee: Siemens Gammasonics, Inc., Des Plaines, Ill.

[21] Appl. No.: 376,093

[22] Filed: May 10, 1982

[51] Int. Cl.³ .................. G01T 1/163; G01T 1/202
[52] U.S. Cl. ................... 250/363 S; 250/369
[58] Field of Search .............. 250/363 S, 369, 366, 250/363 R

[56] References Cited

U.S. PATENT DOCUMENTS

| 3,011,057 | 11/1961 | Anger | 250/366 |
| 3,752,988 | 8/1973 | Culver | 250/270 |
| 3,984,689 | 10/1976 | Arseneau | 250/369 |

*Primary Examiner*—Janice A. Howell
*Assistant Examiner*—Constantine Hannaher
*Attorney, Agent, or Firm*—Karl F. Milde, Jr.

[57] ABSTRACT

Improved detection circuitry is disclosed for calculating the position on the crystal of a scintillation event in a scintillation camera. Electrical signals developed by photomultiplier tubes for successive events are weighted by a resistor matrix and transferred to integrators which develop event position signals based on the quanta of radiation incident on the scintillation crystal. To improve the count rate without sacrificing the resolution, parallel integrators are provided so that a second integrator can integrate electrical signals from a second scintillation event during the time that a first integrator is processing the signals from a first scintillation event. Common storage buffers are connected to the integrators to hold the integrated signals for further processing.

4 Claims, 4 Drawing Figures

DUAL INTEGRATOR FOR A RADIATION DETECTOR

BACKGROUND OF THE INVENTION

1. Field of the Invention

This invention relates to improved event position detection circuitry for use in a radiation detector, such as a scintillation camera for detecting gamma rays.

2. Description of the Prior Art

Radiation detectors are widely used as diagnostic tools for analyzing the distribution of a radiation-emitting substance in an object under study, such as for the nuclear medical diagnosis of a human body organ. A typical radiation detector of a type to which the present invention relates is a commercial version of the Anger-type scintillation camera, the basic principles of which are described in Anger U.S. Pat. No. 3,011,057.

Such a scintillation camera can take a "picture" of the distribution of radioactivity throughout an object under investigation, such as an organ of the human body which has taken up a diagnostic quantity of a radioactive isotope. As individual gamma rays are emitted from the distributed radioactivity in the object and pass through a collimator, they produce scintillation events in a thin planar scintillation crystal. The events are detected by photodetectors positioned behind the crystal. Electronic circuitry translates the outputs of the photodetectors into X and Y coordinate signals which indicate the position in the crystal of each event and a Z signal which indicates generally the energy of the event and is used to determine whether the event falls within a preselected energy window. A picture of the radioactivity distribution in the object may be obtained by coupling the X and Y signals which fall within the preselected energy window to a display, such as a cathode ray oscilloscope which displays the individual scintillation events as spots positioned in accordance with the coordinate signals. The detection circuitry typically provides for integrating a large number of spots onto photographic film.

The "resolution" of a scintillation camera refers to the degree of ability of the camera faithfully to reproduce the spatial distribution of the radioactivity which is within the field of view of the device. The overall intrinsic resolution of the Anger camera detector is generally dependent on the ability of the detector to signal accurately the position coordinates of each scintillation event. There are many operations involved in the detection of each scintillation event and the signaling of its position coordinates.

As described in Arseneau U.S. Pat. No. 3,984,689, the detection circuitry of a typical prior art scintillation camera comprises a plurality of resistors joined into a positioning matrix and connected to receive the electrical pulse outputs of the photodetectors in response to the scintillation events caused in the crystal by incident radiation. Positional signals are developed by the matrix that reflect the instantaneous voltage picture in a two-dimensional rectilinear coordinate system of the position of a particular scintillation event. These signals from the positioning matrix are transferred to integrators which develop signals over a predetermined integrating time based on the associated quanta of radiation incident on the scintillation crystal.

Storage buffers are connected to the integrators to hold the integrated signals for further processing, such as by an energy correction ratio computation circuit and orientation circuits which provide horizontal and vertical deflection of a cathode ray beam.

The integrators connected to receive the outputs of the positioning matrix suffer a certain "input dead time" subsequent to the processing time for an event pulse. When the integrator is busy, holding or transferring signals to the buffer stage, the integrator is unavailable for processing subsequent pulses from the positioning matrix corresponding to further scintillation events. This "input dead time" restricts the count rate of the pulse processing system.

Reducing the "input dead time" to improve count rate by shortening the integration time is unsatisfactory. Reducing the integration time causes a deterioration of the resolution of the scintillation camera. In order to get accurate representative event positioning signals, it is necessary to consider the changes in instantaneous value of a positioning signal over a sufficiently long period of time. To reduce this time period so that integrating time is reduced, causes the resulting values of the positioning signals to be less representative and increases the probability of error.

SUMMARY OF THE INVENTION

It is an object of the present invention to provide improved detection circuitry for calculating the position in a radiation detector of a detected radiation event.

It is a further object of the invention to provide radiation event position detection circuitry for a radiation detector which has an improved count rate without sacrificing resolution.

The circuitry of the invention includes a first integrator for integrating electrical positional signals derived from detectors in response to a first radiation event detected by a radiation detector. A second integrator is connected in parallel to the first integrator for integrating electrical positional signals from a second event during the time that the first integrator is processing the signals from the first event.

Such dual integrator circuitry improves detector performance by permitting integration of current event positional signals by one integrator when the other integrator is busy processing a previous event, thereby reducing integrator "dead time" without shortening integration time.

There have thus been outlined rather broadly the more important objects, features and advantages of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the purposes of this invention. It is important, therefore, that this disclosure be regarded as including such equivalent arrangements as do not depart from the spirit and scope of the invention.

BRIEF DESCRIPTION OF THE DRAWINGS

An embodiment of the invention has been chosen for purposes of illustration and description, and is shown in the accompanying drawings forming a part of the specification, wherein.

DESCRIPTION OF THE PREFERRED EMBODIMENT

Figure 1A:
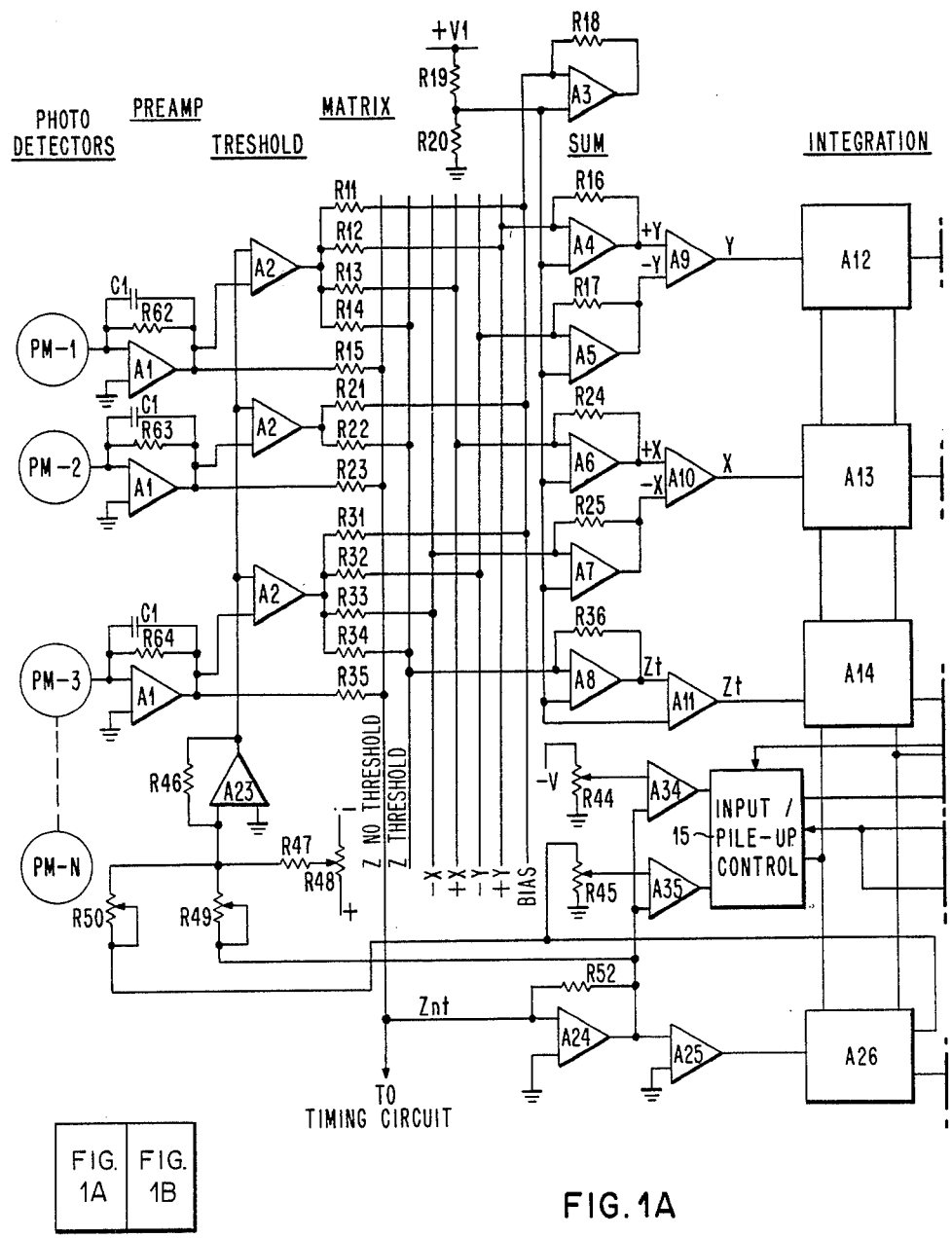
FIG. 1 shows a schematic circuit diagram of the electronics of an Anger-type scintillation camera incorporating dual integrator circuitry in accordance with the invention.
Figure 1B:
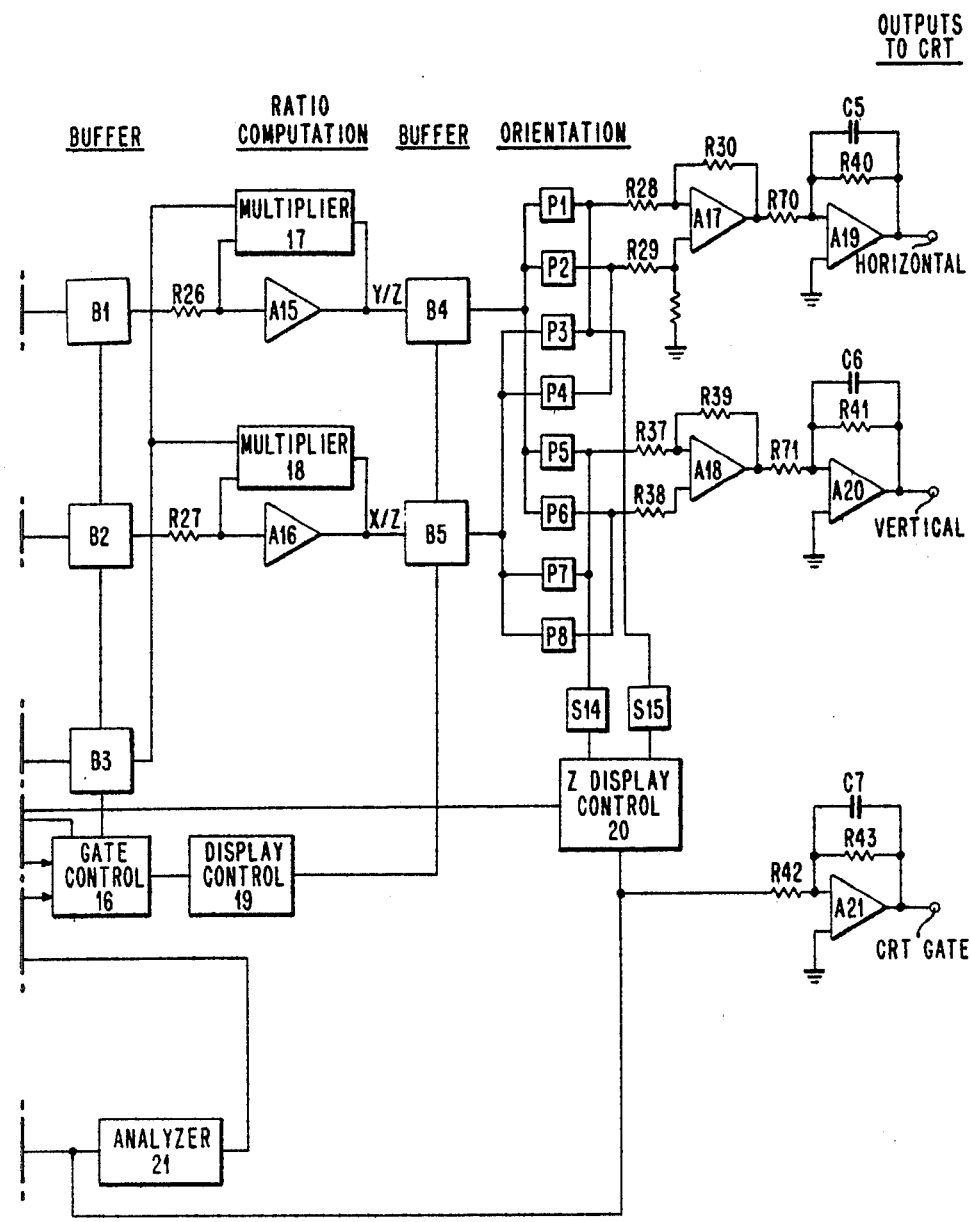

With reference to FIG. 1, an Anger-type scintillation camera has a plurality of photomultiplier tubes PM-1 through PM-N (typically 19 or 37 tubes mounted in a hexagonal array behind a scintillation crystal) which function together to detect a scintillation event that occurs when a gamma ray impinges on the scintillation crustal (the tubes PM-1 through PM-N are labelled "PHOTODETECTORS" in FIG. 1). For purposes of simplification, only the circuitry associated with the first three photomultiplier tubes PM-1, PM-2 and PM-3 is illustrated in detail in FIG. 1. The details of the circuitry of FIG. 1 are described only insofar as they contribute to an understanding of the principles, structure and operation of the claimed invention which relates to the integration portions of FIG. 1. The reader is referred to Anger U.S. Pat. No. 3,011,057; Arseneau U.S. Pat. No. 3,984,689 and to the commonly-owned, co-pending U.S. patent application Ser. No. 273,916 of Arseneau, filed June 15, 1981 and entitled "Dynamic Threshold for Scintillation Camera", for further details of the other aspects of the illustrated circuitry.

The outputs of the photomultiplier tubes PM-1 through PM-N are separately coupled to respectively corresponding preamplifier circuits A1 ("PREAMP"). Each preamplifier circuit A1 has an output coupled to a separate threshold amplifier circuit A2 ("THRESHOLD"). Each of the threshold amplifiers A2 subtracts a prerequisite threshold voltage from the output of the particular preamplifier A1 with which it is associated. An amplifier A23 with a feedback loop employing a resistor R46 supplies a threshold bias to the threshold amplifiers A2. The threshold voltage is established as a function of the energy of the incoming scintillation event, as more fully described in copending U.S. patent application Ser. No. 273,916.

The preamplifiers A1 also have outputs, connected through resistors R15, R23 and R35 directly to a "Z NO THRESHOLD" signal line of the resistor matrix, that are summed to provide an unthresholded energy signal $Z_{nt}$ which represents the total energy of the scintillation event. The unthresholded energy signal $Z_{nt}$ is passed through amplifiers A24 and A25 to an integrator element A26 to provide an integrated energy signal that is delivered as an input to an energy analyzer 21 which determines whether the energy of the detected event falls within a preselected energy window (i.e. whether the event is "valid").

The integrated energy signal output of the integrator element A26 is also connected through a variable resistor R50 to serve as an input to the summing amplifier A23 to dynamically influence the threshold voltage signal which is applied to the threshold amplifiers A2.

The threshold amplifiers A2 operate to pass the preamplifier A1 output signals to the resistor matrix ("MATRIX") and summing amplifiers A4 through A8 ("SUM") whenever the output signal from the corresponding preamplifier A1 exceeds the value of the threshold voltage. If the output of any of the respective preamplifiers A1 is below the threshold, the output signal of the corresponding threshold amplifier A2 is substantially zero.

From the threshold preamplifier A1 outputs, the resistor matrix and summing amplifiers A4 through A8 develop positional coordinate output signals $+Y$, $-Y$, $+X$, $-X$, and a thresholded energy signal $Z_t$. The $+Y$, $-Y$ output signals are fed to a differential amplifier A9 where the $+Y$ and $-Y$ signals are consolidated into a single event Y positional coordinate signal. Similarly, the differential amplifier A10 develops a single consolidated X positional coordinate signal. The $Z_t$ signal passed through the amplifier A11. The resulting X, Y and $Z_t$ signals serve as the respective inputs to the dual integrator elements A12, A13 and A14 ("INTEGRATION").

Figure 2:
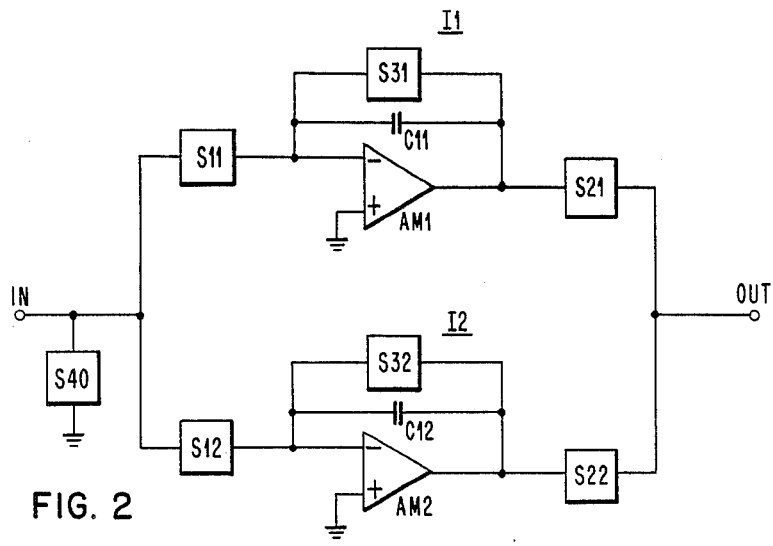
FIG. 2 is a detailed schematic circuit diagram of the integrator elements A12, A13 and A14 of FIG. 1.

The integrator elements A12, A13 and A14 have the identical structure shown in FIG. 2. Each comprises a plurality of integrators I1, I2 connected in parallel. Input switches S11, S12 serially connected at the respective inputs of the integrators I1, I2 serve to select which of the integrators will receive the X, Y or Z signals delivered from the resistor matrix (see FIG. 1) to the input terminal of the integrator element A12, A13, or A14. Output switches S21, S22 serially connected at the respective outputs of the integrators I1, I2 select which integrator output will be delivered to the output terminal of the element A12, A13 or A14 for transfer into the buffer B1, B2 or B3 (see FIG. 1).

Each integrator I1, I2 comprises an operational amplifier AM1, AM2 with a capacitor C11, C12 extending across it as shown in FIG. 2. Switches S31, S32 shunting the capacitors C11, C12 serve to reset the integrators by short-circuiting the capacitors at specified times. Although the dual integrator arrangement shown in FIG. 2 has two integrators, additional integrators (with associated switches) may be connected in parallel thereto if desired. A switch S40 is provided to short out the input of the integrator element A12, A13 or A14, when neither of switches S11 or S12 is conducting (i.e. when all available integrators are busy).

Figure 4:
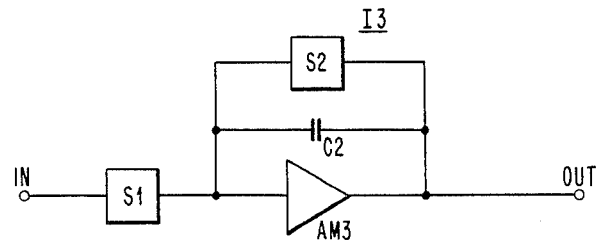
FIG. 4 is a schematic diagram of prior art integrator elements corresponding to the elements A12, A13 and A14 of FIG. 1.

FIG. 4 shows the single integrator arrangement of prior art elements described in U.S. Pat. No. 3,984,689 which correspond to the elements A12, A13 and A14 of FIGS. 1 and 2. Each prior art integrator element comprises an amplifier AM3, an integrating capacitor C2, an input switch S1 and a reset switch S2.

The input switch S1 serially connected at the input of the amplifier AM3 allows the integrator I3 to be disconnected from the photodetectors PM1 through PM-N from the time that a single scintillation in the crystal is detected until processing of the resulting pulses is completed. With the prior art arrangement, if another scintillation occurs while the integrator information from the prior scintillation is being analyzed, the switch S1 acts to prevent the pulses from the second event from changing the values in the integrator I3. That is significant when the pulses of the two events are separated by an interval of time such that they are not piled-up sufficiently to activate the pile-up control circuit 15, but are sufficiently close in time so that the charge in integrator I3 would be affected. The integrator I3 is disconnected from the photodetectors so that the charge from the second pulse cannot begin building up until switch S1 reconnects the integrator I3 to the photodetectors.

As described in the '689 patent, when the integrated value of the unthresholded energy signal for a particular event falls within the preselected energy window, the analyzer 21 actuates the gate control circuit 16 which in turn opens the gates to the sample and hold circuits B1, B2 and B3. The integrated Y, X and $Z_t$ signals from the capacitors C2 of the integrator elements A12, A13 and A14 are then allowed to enter the circuits B1, B2 and B3, respectively. The switches S2 (FIG. 4) thereafter discharge the capacitors C2 and the integrators are free to handle subsequent input pulses. In the single integrator arrangement of the prior art first buffer stage integrating elements A12, A13 and A14, pulses from a second event received during the "input dead time" of the integrator (the time within which it is busy, holding or transferring the integrated signal to the buffer stage) are not processed and are thus "lost" for diagnostic purposes.

The dual integrator arrangement of the invention functions to reduce the loss of information during "input dead time". As in the prior art element configuration of FIG. 4, pulses received for a first event at the input of the element of FIG. 2 are directed to a single integrator I1 (switch S11 is closed, switch S12 is opened). And as with the prior art element, when the capacitor C11 has been charged by the first event pulse, the switch S11 opens to prevent subsequent pulses from changing the capacitor charge during the time the charge is being held and transferred to the buffer stage. However, in contrast to the prior art structure, in the dual integrator structure of FIG. 2, when switch S11 opens and integrator I1 enters an "input dead time" period, switch S12 closes to permit a subsequent pulse corresponding to a second event (which occurs during the "busy" time of the integrator I1, but not so close as to be eliminated by the pile-up control) to be integrated by the integrator I2. Switch S12 will then open after capacitor C12 has been charged, to permit the charge to be held and transferred to the buffer stage from integrator I2. Switches S21 and S22 are set to selectively connect/disconnect the integrators I1, I2 to the buffer stage.

The operation of switches S11, S12 is controlled by an input and pile-up control circuit 15. Switches S11 and S12 operate so that one will be closed only when a signal is present at the input and the associated integrator is not busy. At times, both S11 and S12 will be open and switch 40 will be closed to short-circuit the input of the element A12, A13 or A14 to ground. The control 15 also serves as the actual timing mechanism for the operation of the reset switches S31 and S32. After the event is passed to the next stage or rejected, the switches S31, S32 serve to reset the integrators I1, I2 by dumping the capacitor charges.

Figure 3:
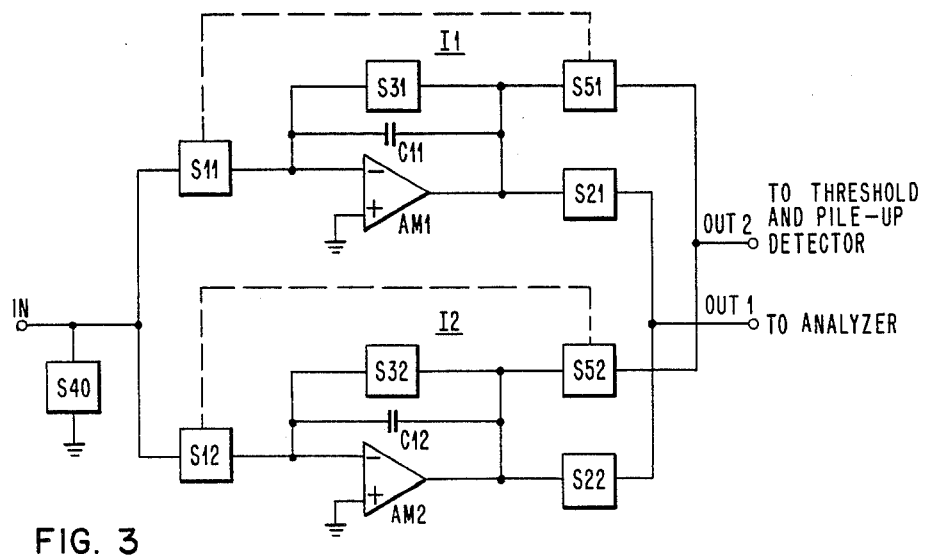
FIG. 3 is a detailed schematic circuit diagram of the integrator element A26 of FIG. 1.

FIG. 3 shows the structure of the integrating element A26 of FIG. 1. It is similar to the structure of the elements A12, A13 and A14 already discussed in connection with FIG. 2 above. The input terminal receives pulse signals corresponding to the unthresholded energy of detected events and passes them after integration to the analyzer 21. Switches S11 and S12 of the element 26 operate the same as the switches S11 and S12 of the elements A12, A13 and A14 so that the integrator I2 can process pulses from subsequent events while the integrator I1 is busy, holding and transferring the integrated signal from a prior event. The element 26, however, has a second output terminal and switches S51 and S52 arranged for selectively connecting the output of either integrator I1 or I2 to the dynamic threshold setting and pile-up detector circuits (see FIG. 1). As indicated by the dashed lines in FIG. 3, S51 is controlled to always be set (open or closed) the same as switch S11, and switch S52 is controlled to always be set the same as switch S12.

A decision as to whether or not signals will be passed from the integration elements A12, A13 and A14 to the buffers B1, B2 and B3 (FIG. 1) is made by the analyzer 21. Analyzer 21 looks at the integrated value of the unthresholded Z signal received from element 26, to see if it falls within the energy-window which the user has determined to be acceptable. If it is acceptable, the analyzer 21 actuates the gate control circuit 16 which in turn opens gates of the sample and hold circuits B1, B2 and B3 to receive the selected integrator I1 or I2 outputs. The integrated signals from the first or second integrator of the dual integrators A12 to A14 are then allowed to enter the sample and hold circuits B1 to B3 by passing the output switches S21 or S22. It should be noted that the output switches S21, S22 are connected so that only one event integration result is delivered to the output at any one time.

In operation, for example, a first event Y-positional signal pulse received at the input of the element 12 will be delivered to the first integrator I1 (switch S11 closed, switches S12, S40 open). After the set pulse integration time has elapsed (assuming no pile-up occurs and that the analyzer 21 passes the pulse), the integrator I1 will be disconnected from the input of element 12 (switch S11 open) and the integrated signal stored on capacitor C11 will be delivered to the buffer B1 (switch S21 closed, switch S22 open). During this "input dead time" of the integrator I1, a second pulse received at the input of element 12 for a subsequent event will be delivered to the second integrator I2 (switch S12 closed, switches S11, S40 open) for integration. After the set pulse integration time, the integrated signal for the second event will be delivered to the buffer B1 (switch S21 open, switch S22 closed). If another subsequent event is now received at the input of the element 12, it will be delivered to the integrator I1 (switch S11 closed; seitches S12, S40 open), unless the integrator I1 has not completed processing of a previous (i.e. the first) pulse. If a previous pulse is still being processed, switch S11 will remain open (switch S12 still open) and switch S40 will be closed to connect the input of element 26 to ground. (If the dual integrator construction includes more than two integrators, additional pulses can be switched to these other integrators.)

The integrated X, Y and $Z_t$ signals transferred to the buffers are then applied to ratio computation circuitry (amplifiers A15, A16 and multipliers 17, 18 labeled "RATIO COMPUTATION" in FIG. 1) where the X and Y signals are divided by the thresholded energy signal $Z_t$ to produce normalized $\overline{X}$ and $\overline{Y}$ positional coordinate signals for the image event. The $\overline{X}$ and $\overline{Y}$ signals are then passed to the CRT display.

For scintillation events whose unthresholded energy signals fall within the preselected energy window, the CRT display produces spots on a screen at a location corresponding to the input position coordinates $\overline{X}$ and $\overline{Y}$ received from the ratio computation circuitry. The orientation switches P1 through P8 ensure that the correct orientation exists with regard to the $\overline{X}$ and $\overline{Y}$ deflection signals.

Having thus described the invention with particular reference to the preferred forms thereof, it will be obvi- ous to those skilled in the art to which the invention pertains, after understanding the invention, that various changes and modifications may be made therein without departing from the spirit and scope of the invention as defined by the claims appended hereto. It will be appreciated that the selection, connection and layout of the various components of the described configurations may be varied to suit individual tastes and requirements.

What is claimed is:

1. In a scintillation camera having a plurality of photodetectors arranged to view overlapping areas of a crystal and detection circuitry for calculating the position on the crystal of a scintillation event based on the receipt of signals from the photodetectors in response to radiation impinging on the crystal, the detection circuitry including a first integrator for integrating the electrical signals corresponding to an event, the improvement comprising a second integrator connected in parallel to the first integrator and switching means for controlling the operation of the first and second integrators so that alternatingly with each incoming event one of the integrators is integrating signals corresponding to an event, while the other integrator is transferring the result of integrating signals corresponding to another event and is being reset.

2. The improvement as defined in claim 1, further comprising a buffer for storing signals for further processing, wherein each of the integrators comprises means for receiving and integrating signals from the photodetectors, means for resetting the integrator, and means for transferring the integrated signal to the buffer.

3. A scintillation camera comprising a crystal;
a plurality of photomultiplier tubes arranged to view overlapping areas of the crystal;
event position calculating circuitry for calculating the position of a scintillation event on the crystal on the basis of the output signals of the photomultiplier tubes; and
means for integrating signals received from the photomultiplier tubes in response to scintillation events and thereafter transferring the integrated signals for further processing so that alternatingly integrated signals from a first event are being transferred during the time that signals from a second event are being integrated.

4. A camera as defined in claim 3, wherein the integrating circuitry comprises;
first and second integrating circuits connected in parallel;
each of said integrating circuits comprising a proportional amplifier having an input gate, an output gate and a reset switch connected to the input gate for resetting that integrator by bridging the amplifier; and
means for controlling the respective input gates and output gates so that the gates of the first circuit are in opposite conducting states to the gates of the second circuit.

* * * * *